US009322674B2

(12) United States Patent
Rassomagin et al.

(10) Patent No.: US 9,322,674 B2
(45) Date of Patent: Apr. 26, 2016

(54) INCREMENTAL CAPACITIVE ANGULAR DISPLACEMENT TRANSDUCER

(71) Applicant: Vladimir Ivanovich Gnevanov, Perm (RU)

(72) Inventors: Vasiliy Radionovich Rassomagin, Perm (RU); Vladimir Ivanovich Gnevanov, Perm (RU)

(73) Assignee: Vladimir Ivanovich GNEVANOV, Perm (RU)

( * ) Notice: Subject to any disclaimer, the term of this patent is extended or adjusted under 35 U.S.C. 154(b) by 840 days.

(21) Appl. No.: 13/625,059

(22) Filed: Sep. 24, 2012

(65) Prior Publication Data

US 2013/0162272 A1 Jun. 27, 2013

Related U.S. Application Data

(63) Continuation of application No. PCT/RU2010/000334, filed on Jun. 18, 2010.

(30) Foreign Application Priority Data

Mar. 23, 2010 (RU) ................................ 2010110669

(51) Int. Cl.
*G01B 7/30* (2006.01)
*G01D 5/241* (2006.01)
*G01D 5/22* (2006.01)

(52) U.S. Cl.
CPC ................ *G01D 5/2412* (2013.01); *G01B 7/30* (2013.01); *G01D 5/2291* (2013.01)

(58) Field of Classification Search
CPC .................................................... G01D 5/2291
See application file for complete search history.

(56) References Cited

U.S. PATENT DOCUMENTS 4,092,579 A * 5/1978 Weit ..................... G01D 5/2412
318/662
5,598,153 A * 1/1997 Brasseur et al. ......... G01B 7/30
340/870.37

(Continued)

FOREIGN PATENT DOCUMENTS

CN 1044853 A 8/1990
DE 10113378 A1 10/2002

(Continued)

OTHER PUBLICATIONS

International Search Report dated Dec. 2, 2010 from corresponding International Application No. PCT/RU2010/000334, filed on Jun. 18, 2010.
Gerasimov, V.G., et al., "Electrotechnical Guide", vol. 1, pp. 148-149, M.: Energoatomizdat.

(Continued)

*Primary Examiner* — Patrick Assouad
*Assistant Examiner* — Haidong Zhang
(74) *Attorney, Agent, or Firm* — Patentbar International, P.C.

(57) ABSTRACT

Incremental angular capacitive displacement transducer has movable and fixed dielectric plates, sections of electrode, sections of two electrodes located on side of movable dielectric plate facing fixed dielectric plate, and signal conversion unit. The transducer has six oscillating circuits with inductance coils, and sections of six electrodes of three oscillating circuits situated by circumference on side of fixed disc facing movable disc, sections of six electrodes of three oscillating circuits on smaller diameter circumference on side of fixed disc facing movable disc, sections of common electrode of three oscillating circuits located by circumference on side of movable disc facing fixed disc above sections of six electrodes of three oscillating circuits, sections of common electrode of three oscillating circuits situated by smaller diameter circumference on side of movable disc, and signal conversion unit with six inductance coils, and six inductance coils for reading the resonant oscillation frequency of six oscillating circuits.

2 Claims, 8 Drawing Sheets

(56) References Cited

U.S. PATENT DOCUMENTS

| | | | | |
|---|---|---|---|---|
| 5,872,408 | A | * | 2/1999 | Rakov .................. G01D 5/2412 310/168 |
| 2003/0010138 | A1 | * | 1/2003 | Madni et al. ............ G01L 5/221 73/862.337 |
| 2004/0041572 | A1 | * | 3/2004 | Lin et al. ............... G01D 5/2405 324/661 |
| 2007/0180924 | A1 | * | 8/2007 | Warren et al. .......... B82Y 35/00 73/780 |
| 2008/0087542 | A1 | | 4/2008 | Moore et al. |

FOREIGN PATENT DOCUMENTS

| | | |
|---|---|---|
| JP | 2212715 A | 8/1990 |
| SU | 1502959 A1 | 8/1989 |
| SU | 1504493 A1 | 8/1989 |

OTHER PUBLICATIONS

Koritckiy, Iu. V., "Electrotechnical Materials Guide", vol. 2, pp. 295-296, M.: Energiia.

Saveliev, I.V., "General Physics Course", vol. 2, p. 254, M.: Nauka.

* cited by examiner

INCREMENTAL CAPACITIVE ANGULAR DISPLACEMENT TRANSDUCER

RELATED APPLICATIONS

This application is a continuation of International Patent Application No. PCT/RU2010/000334, filed Jun. 18, 2010, which claims priority to Russian Patent Application No. 2010110669, filed Mar. 23, 2010, both of which are incorporated herein by reference in their entirety.

FIELD OF THE INVENTION

Invention refers to automation and computer engineering and is meant for application in devises of angular displacement measuring automation as fine reading channel.

BACKGROUND OF THE INVENTION

Capacitive angular displacement transducer is known (see description of USSR No 1502959 A1, MEIK G 01 B 7/30) which comprises flat disc electrode set with possibility to move, which has through sector-shaped openings with the specified interval. Fixed flat dielectric base is set coaxially with movable electrode. Concentric electrically insulated from each other external and internal conductive rings are fixed on its internal surface facing movable electrode. Phase-sensitive meter is connected to rings during measuring. Allocated by base circumference and situated in the interval between rings sector-shaped electroconductive radial plates electrically insulated from each other are located on the same dielectric base surface. Couples of ring potential electrodes situated concentrically are fixed on reverse side of dielectric transducer base, opposite radial plates. 4-phase power source of alternating current is connected to them during measuring. Each of potential electrode couples is executed in the form of conjugated ring strips with sinusoidal shape teeth. Sinusoid period is equal to movable disc electrode openings location period. Sector-shaped radial plates overlap both potential electrodes couples. Number of radial plates is selected in several times exceeding number of movable electrode openings.

Low measuring accuracy of analog capacitive angular displacement transducer is determined by presence of external connecting conductors between conductors located on fixed disc base and phase-sensitive meter (4-phase power source of alternating current). Due to this measuring accuracy is affected by alterations of capacity, inductance and electrical resistance of external connecting conductors, for example, at external environment temperature change.

In capacitive angular displacement transducer measuring result depends on dielectric conductivity of medium between flat disc electrode and fixed disc base which also reduces measuring accuracy.

Low manufacturability is determined by necessity to execute on movable disc electrode through sector-shaped openings with the determined interval.

The most similar analog the prototype of the proposed incremental capacitive angular displacement transducer is device presenting capacitive differential displacement transducer (see description of USSR No 1504493 A1, MIIK G 01 B 7/30).

The indicated capacitive differential displacement transducer the prototype comprises electrically next nearest connected potential electrode sections which form two groups situated on the opposite plane-parallel sides of dielectric plate set with possibility to move between two fixed dielectric plates, on internal sides of which facing groups of potential electrode sections, current electrode sections are located jointed by means of inter-section electrical next nearest connections and also forming two section groups. Width and distance between potential electrode sections are equal to current electrode section width.

Sectioned shielding electrode connected to common point of the device has sections with the same width as sections of potential or current electrode and are located on movable plate between potential electrode sections. Potential (or current electrode) sections groups are offset relative to each other for half of their section width. In execution variant potential electrode sections may be located on fixed plates and current electrode sections on movable plate. Current electrode sections are joined by means of inter-sections electrical connections on two fixed dielectric plates by concentric connecting conductors. Conductors directly adjoin the connected current electrode sections and their radiuses are equal correspondingly to external and internal radiuses of these sections. Screening layer is coated on surface of two fixed dielectric plates outside the limits of current electrode sections and adjoining conductors.

Potential electrode sections on both sides of movable plate are joined by means of concentric conductors. Potential electrode sections are connected to correspondent concentric conductors by means of radial taps from these sections angles.

Low measurement accuracy of capacitive differential displacement transducer prototype is conditioned by presence of connecting conductors between electrode sections situated on movable and two fixed plates and signal conversion unit. Due to this measurement accuracy is influenced by alterations of capacity, inductance and electrical resistance of connecting conductors and also electronic elements of signal conversion unit, for example, at external environment temperature change.

SUMMARY OF THE INVENTION

The task of the invention is development of incremental capacitive angular displacement transducer with simple construction, which is more manufacturable and reliable at heavy-load conditions, with higher measurement accuracy.

Assigned task is solved with the help of criterions indicated in the 1-st paragraph of formula of invention common with the prototype, such as incremental capacitive angular displacement transducer comprising movable and fixed dielectric plates, electrode sections, jointed by means of inter-section electrical connections and situated on the fixed dielectric plate side facing movable dielectric plate, two electrodes section situated on movable dielectric plate side facing fixed dielectric plate and a signal conversion unit, and characteristic features such as movable and fixed plates executed in the form of discs. Transducer is provided with six oscillating circuits with inductance coils galvanically isolated from signal conversion unit, sections of six electrodes of three oscillating circuits situated by circumference on fixed disc side facing movable disc, sections of six electrodes of three oscillating circuits situated by smaller diameter circumference on fixed disc side facing movable disc, sections of common electrode of three oscillating circuits situated by circumference on movable disc side facing fixed disc above sections of six electrodes of three oscillating circuits, sections of common electrode of three oscillating circuits situated by smaller diameter circumference on movable disc side facing fixed disc above sections of six electrodes of three oscillating circuits, and signal conversion unit comprises six inductance coils for injecting energy into six oscillating circuits and six inductive coils for reading the resonant oscillation frequency of six oscillating circuits.

Paragraph 2 of formula reflects peculiarities of execution and situation of six inductance coils of six oscillating circuits, of six inductance coils for injecting energy into six oscillating circuits and six inductance coils for reading the resonant oscillation frequency of six oscillating circuits of signal conversion unit, namely, six inductance coils of six oscillating circuits, six inductance coils for injecting energy into six oscillating circuits and six inductance coils for reading the resonant oscillation frequency of six oscillating circuits of signal conversion unit are executed in the form of flat spirals and situated on fixed disc external side.

The proposed incremental capacitive angular displacement transducer has high manufacturability as on fixed disc beside electrode sections there are located, executed by print method, six flat spirals of inductance coils of six oscillating circuits, six flat spirals of inductance coils for injecting energy into six oscillating circuits and six flat spirals of inductance coils for reading the resonant oscillation frequency of six oscillation circuits of signal conversion unit.

High measuring accuracy of the proposed incremental capacitive angular displacement transducer is conditioned by galvanic isolation of six oscillating circuits from signal conversion unit. Due to this there are no connecting conductors between six oscillating circuits and signal conversion unit which increase measuring accuracy.

Stated above complex of essential features allows to receive the following technical result—increase of manufacturability and angular displacement measuring accuracy.

BRIEF DESCRIPTION OF THE DRAWINGS

Construction of the proposed incremental capacitive angular displacement transducer is illustrated by the following drawings.

DETAILED DESCRIPTION OF THE PREFERRED EMBODIMENTS

Figure 1:
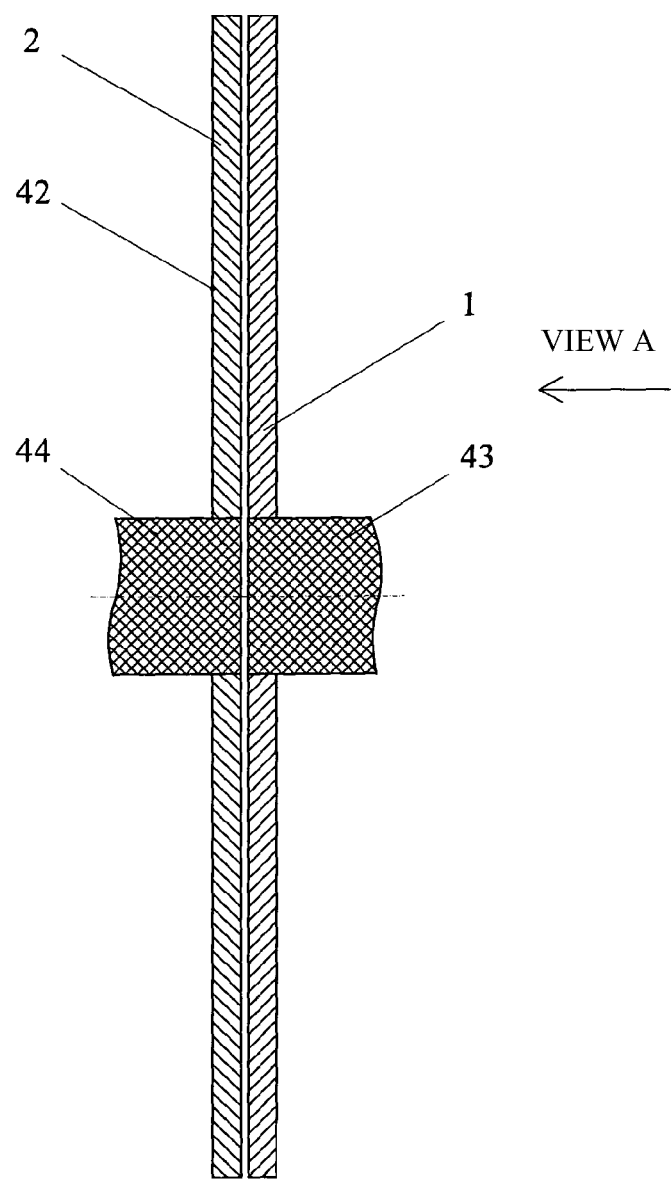
FIG. 1 shows incremental capacitive angular displacement transducer, longitudinal section.

FIG. 1 represents case-less incremental capacitive angular displacement transducer.

Case execution of the proposed incremental capacitive angular displacement transducer is possible (not shown) with precision bearing. Angular displacement transducer of rough reading channel may be mounted inside the case in any convenient position which may be not only a capacitive one but, for example, based on resistive measurement principle.

Figure 2:
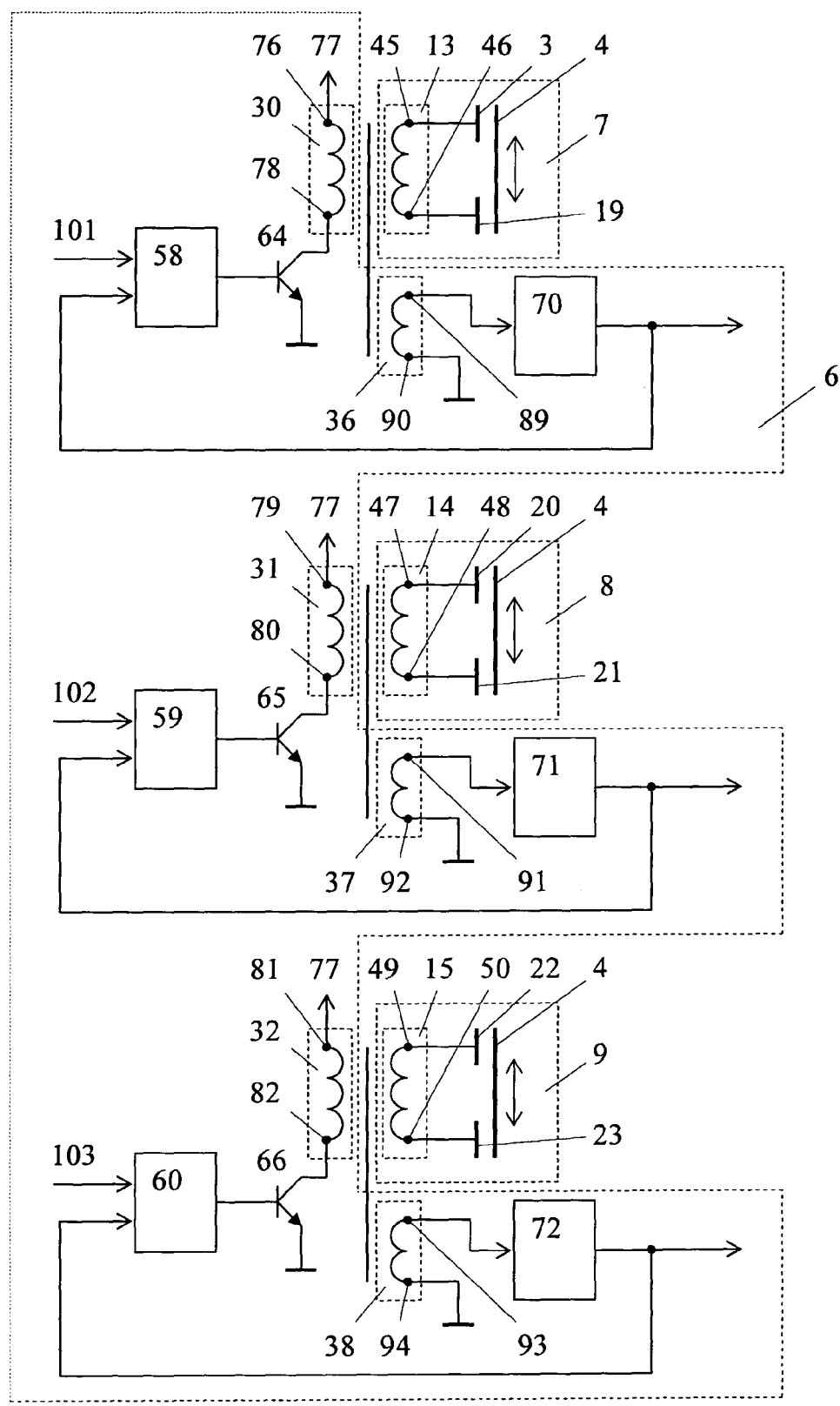
FIG. 2 and FIG. 3 show structure chart of incremental capacitive angular displacement transducer.
Figure 3:
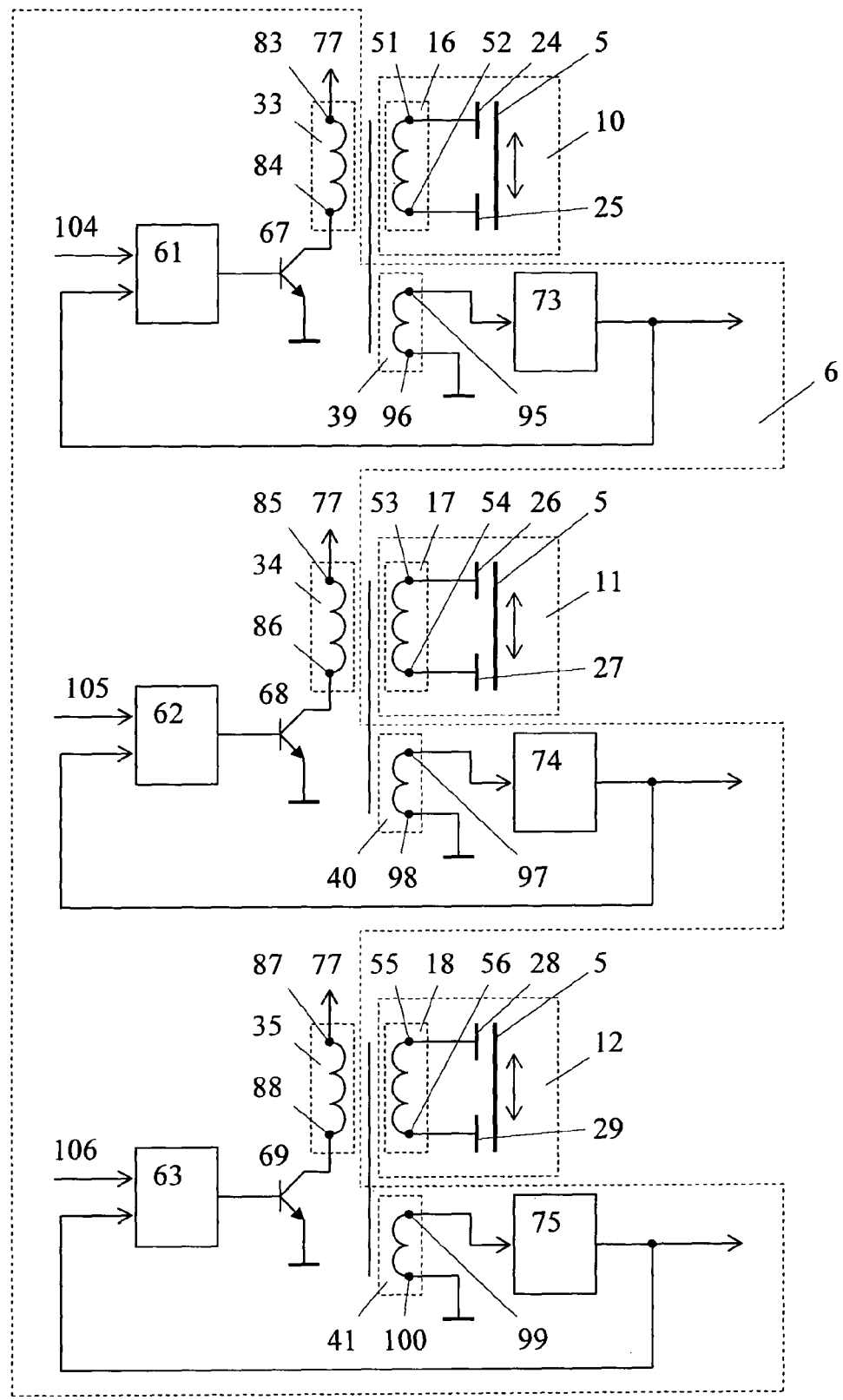

The proposed incremental capacitive angular displacement transducer (see FIG. 1), comprises movable 1 disc, fixed 2 disc and signal conversion unit 6 (see FIG. 2 and FIG. 3). Central openings are executed in movable 1 and fixed 2 discs. Movable 1 disc is connected with movable 43 object, and fixed 2 disc is connected with fixed 44 object.

Movable 1 and fixed 2 discs are executed from dielectric material, for example, from photoceram glass FS 148-1, described in the book edited by Iu. V. Koritckiy "Electrotechnical Materials Guide", vol. 2.—M.: Energiia, 1974, p. 295, 296. Use of photoceram glass FS 148-1 in construction of the indicated transducer allows to get, as a result of multistage process, photographically exact micro-openings in fixed 2 disc. Photoceram glass FS 148-1 by thermal expansion coefficient well conforms copper conductors (ductile metal), produced by print method on movable 1 and fixed 2 discs with chromium sub-layer thickness from 0.01 mcm and to 0.03 mcm for good adhesion to photoceram glass FS 148-1.

Thickness of copper conductors produced by print method on facing each other sides of movable 1 and fixed 2 discs may be 1 mcm. For protection from external environment the indicated conductors may be covered with thing layer of negative photoresist which may be dried at temperature more than 140 degrees Celsius.

Movable 1 and fixed 2 discs thickness may be 0.5 mm.

Incremental capacitive angular displacement transducer is provided with (see FIG. 2 and FIG. 3) the first 7, the second 8, the third 9, the fourth 10, the fifth 11 and the sixth 12 oscillating circuits which are galvanically isolated from each other and from signal conversion unit 6.

Flat spiral of inductance coil 13 of the first 7 oscillating circuit (see FIG. 4), flat spiral of inductance coil 14 of the second 8 oscillating circuit, flat spiral of inductance coil 15 of the third 9 oscillating circuit, flat spiral of inductance coil 16 of the fourth 10 oscillating circuit, flat spiral of inductance coil 17 of the fifth 11 oscillating circuit and flat spiral of inductance coil 18 of the sixth 12 oscillating circuit are situated by circumference on external side 42 of fixed 2 disc.

Figure 5:
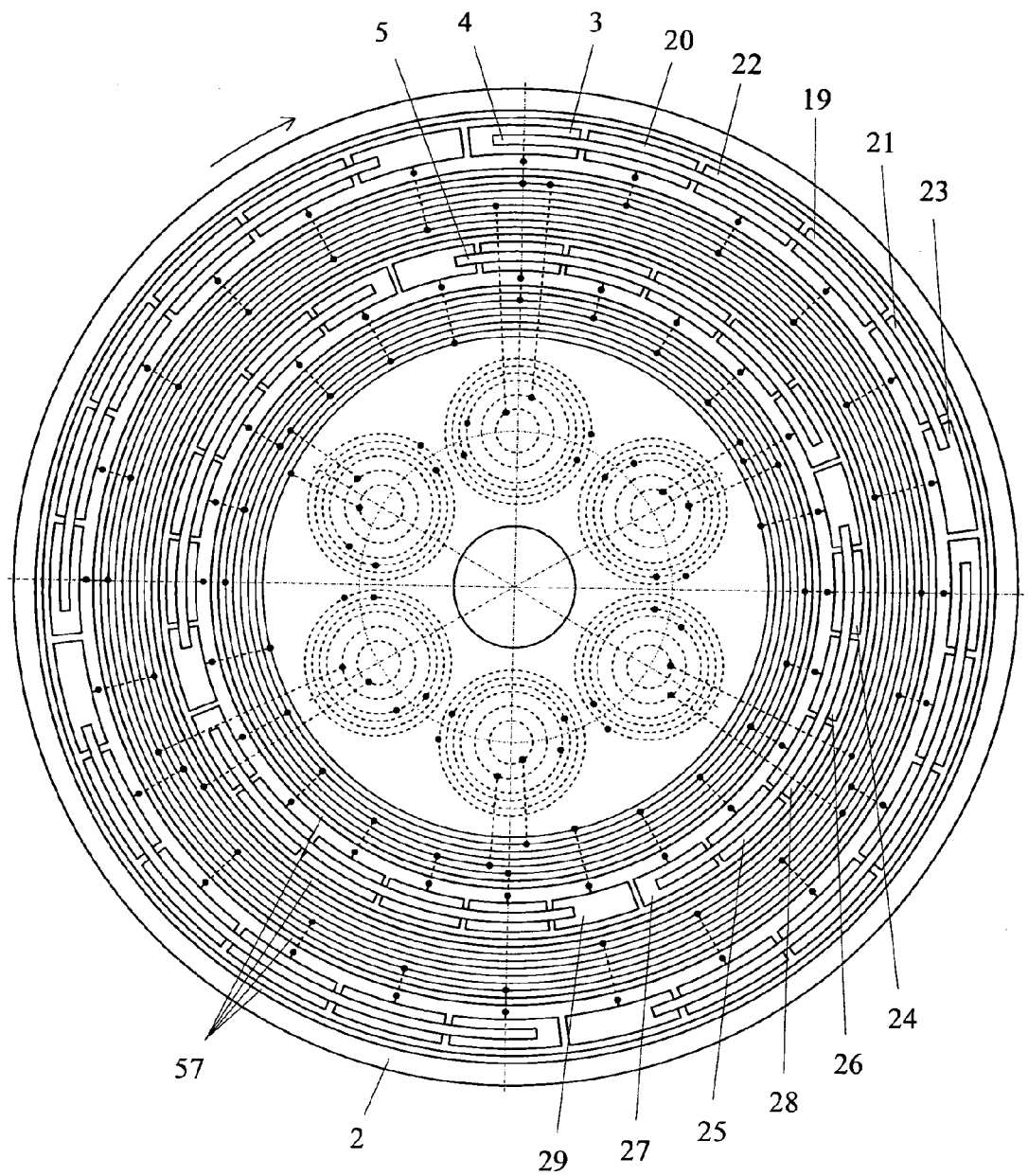
FIG. 5 shows view A in FIG. 1 at conditionally transparent movable disc (movable disc conductors are situated above fixed disc conductors).

Four sections of the first 3 electrode of the first 7 oscillating circuit (see FIG. 5), four sections of the second 19 electrode of the first 7 oscillating circuit, four sections of the first 20 electrode of the second 8 oscillating circuit, four sections of the second 21 electrode of the second 8 oscillating circuit, four sections of the first 22 electrode of the third 9 oscillating circuit and four sections of the second 23 electrode of the third 9 oscillating circuit are jointed by means of inter-section electrical connections and are situated (evenly distributed) by circumference on fixed 2 disc side facing movable 1 disc (in FIG. 5 only one of four sections of each indicated electrodes is designated for clearness).

Four sections of the first 24 electrode of the fourth 10 oscillating circuit (see FIG. 5), four sections of the second 25 electrode of the fourth 10 oscillating circuit, four sections of the first 26 electrode of the fifth 11 oscillating circuit, four sections of the second 27 electrode of the fifth 11 oscillating circuit, four sections of the first 28 electrode of the sixth 12 oscillating circuit and four sections of the second 29 electrode of the sixth 12 oscillating circuit are jointed by means of inter-section electrical connections and are situated (evenly distributed) by smaller diameter circumference on fixed 2 disc side facing movable 1 disc (in FIG. 5 only one of four sections of each indicated electrodes is designated for clearness).

Number of sections in each electrode of oscillating circuits equal to four is preferable.

In general case number of sections in each of electrodes of six oscillating circuits may be equal to eight (multiple of four).

Each section of twelve electrodes of six oscillating circuits situated on fixed 2 disc is inside angular sector equal to 15 degrees (interval between neighboring sections has small angular width). Sections of twelve electrodes of six oscillating circuits situated on fixed 2 disc have equal angular width.

The beginning 45 of flat spiral of inductance coil 13 of the first 7 oscillating circuit is connected to four sections of the first 3 electrode of the first 7 oscillating circuit, the end 46 of flat spiral of inductance coil 13 of the first 7 oscillating circuit is connected to four sections of the second 19 electrode of the first 7 oscillating circuit, the beginning 47 of flat spiral of inductance coil 14 of the second 8 oscillating circuit is connected to four sections of the first 20 electrode of the second 8 oscillating circuit, the end 48 of flat spiral of inductance coil 14 of the second 8 oscillating circuit is connected to four sections of the second 21 electrode of the second 8 oscillating circuit, the beginning 49 of flat spiral of inductance coil 15 of the third 9 oscillating circuit is connected to four sections of the first 22 electrode of the third 9 oscillating circuit, and the end 50 of flat spiral of inductance coil 15 of the third 9 oscillating circuit is connected to four sections of the second 23 electrode of the third 9 oscillating circuit.

The beginning 51 of flat spiral of inductance coil 16 of the fourth 10 oscillating circuit is connected to four sections of the first 24 electrode of the fourth 10 oscillating circuit, the end 52 of flat spiral of inductance coil 16 of the fourth 10 oscillating circuit is connected to four sections of the second 25 electrode of the fourth 10 oscillating circuit, the beginning 53 of flat spiral of inductance coil 17 of the fifth 11 oscillating circuit is connected to four sections of the first 26 electrode of the fifth 11 oscillating circuit, the end 54 of flat spiral of inductance coil 17 of the fifth 11 oscillating circuit is connected to four sections of the second 27 electrode of the fifth 11 oscillating circuit, the beginning 55 of flat spiral of inductance coil 18 of the sixth 12 oscillating circuit is connected to four sections of the first 28 electrode of the sixth 12 oscillating circuit, and the end 56 of flat spiral of inductance coil 18 of the sixth 12 oscillating circuit is connected to four sections of the second 29 electrode of the sixth 12 oscillating circuit.

Conductors of the first 7, the second 8 and the third 9 (or the fourth 10, the fifth 11 and the sixth 12) oscillating circuits situated on both sides of fixed 2 disc are produced in the same way in one technological cycle so that correspondent geometry sizes of conductors of the indicated oscillating circuits have as less difference as possible.

Due to this capacities, inductances and electrical resistances of the indicated conductors of the first 7, the second 8 and the third 9 (or the fourth 10, the fifth 11 and the sixth 12) oscillating circuits are almost equal to each other. The indicated capacities are constant constituents of capacities of the first 7, the second 8 and the third 9 (or the fourth 10, the fifth 11 and the sixth 12) oscillating circuits and practically do not change at angle displacement (rotation) of movable 1 disc relative to fixed 2 disc.

At equality of capacities, inductances and electrical resistances of the first 7, the second 8 and the third 9 (or the fourth 10, the fifth 11 and the sixth 12) oscillating circuits the minimum resonant oscillation frequencies of the indicated oscillating circuits are equal to each other at rotation of movable 1 disc relative to fixed 2 disc (the indicated operation mode may be used at transducer tuning). If necessary, constant components of capacities of the indicated oscillating circuits may be aligned by change of correspondent connecting conductors width.

Conductors manufacturing errors averaging occurs in each oscillating circuit by all eight sections (elemental capacitors plates) of two electrodes, equally distributed by correspondent circumference on fixed 2 disc side facing movable 1 disc and sections of two common electrodes of six oscillating circuits situated on movable 1 disc side facing fixed 2 disc.

At even distribution of sections of each electrode of six oscillating circuits by corresponding circumferences on facing each other sides of movable 1 and fixed 2 discs, the influence to measuring results of movable 1 and fixed 2 discs' surfaces nonparallelism, and the indicated discs misalignment (offsetting) relative to each other reduces.

Four screening concentric 57 conductors (see FIG. 5) are executed in the form of four metal rings and meant for alignment of constant components of capacities of the first 7, the second 8 and the third 9 (or the fourth 10, the fifth 11 and the sixth 12) oscillating circuits among each other.

FIG. 5 shows initial relative position of movable 1 disc relative to fixed 2 disc corresponding to angular degree zero (arrow shows movable 1 disc rotation direction). Dashed lines show conductors situated on external side 42 of fixed 2 disc.

Figure 6:
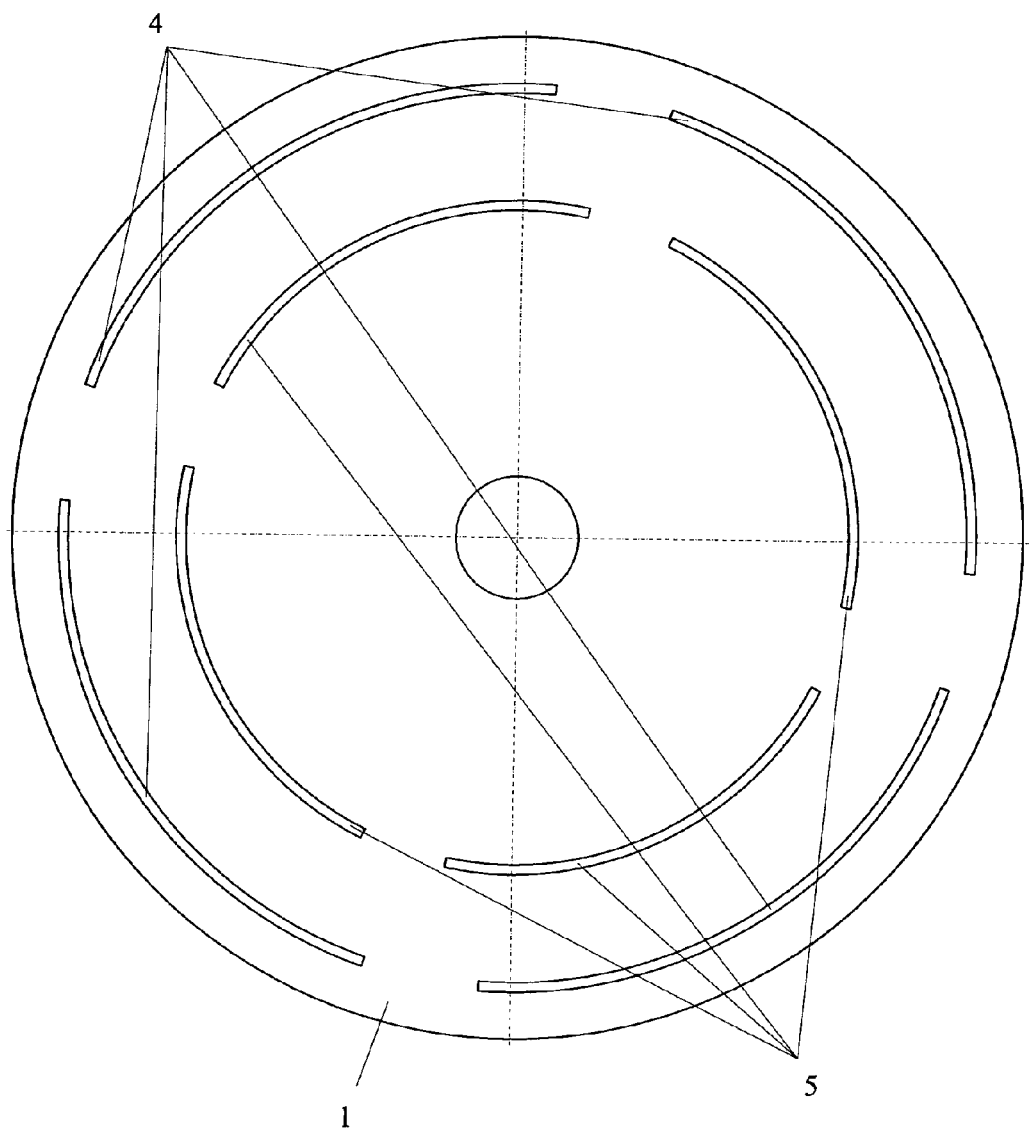
FIG. 6 shows a view of movable disc from the side facing fixed disc.

Four sections of common electrode 4 of the first 7, the second 8 and the third 9 oscillating circuits (see FIG. 5 and FIG. 6) are situated and evenly distributed by circumference on the side of movable 1 disc facing fixed 2 disc above sections of six electrodes of the first 7, the second 8 and the third 9 oscillating circuits.

Four sections of common electrode 5 of the fourth 10, the fifth 11 and the sixth 12 oscillating circuits (see FIG. 5 and FIG. 6) are situated and evenly distributed by smaller diameter circumference on the side of movable 1 disc facing fixed 2 disc above sections of six electrodes of the fourth 10, the fifth 11 and sixth 12 oscillating circuits.

In FIG. 5 for image clearness only one of four sections of common electrode 4 of the first 7, the second 8 and the third 9 oscillating circuits is designated, and also of common electrode 5 of the fourth 10, the fifth 11 and the sixth 12 oscillating circuits.

Section is a plate limited by external circumference, internal circumference and two radiuses.

Each section situated on movable 1 disc takes angular sector equal to 75 degrees.

Four sections of common electrode 5 of the fourth 10, the fifth 11 and the sixth 12 oscillating circuits are offset by circumference relative to four sections of common electrode 4 of the first 7, the second 8 and the third 9 oscillating circuits for 7.5 degrees.

Six flat spirals of inductance coils of six oscillating circuits may have the following parameters:

Mean diameter of inductance coil flat spiral—6 mm;
Number of turns—50;
Width of turn—30 mcm;
Interval between turns—10 mcm;
Inductance—20 mcHn.

Thickness of copper conductors produced by print method on external side 42 of fixed 2 disc may be 15 mcm. Due to this six oscillating circuits Q-factor rises which may become more than 50 units.

Inductance of flat (disc) coil, Hn, is calculated by formula (see book edited by V. G. Gerasimov et al. "Electrotechnical Guide", vol. 1.—M.: Energoatomizdat, 1985, p. 148, 149):

$$L = 0.5 \cdot 10^{-7} \cdot \omega^2 \cdot \kappa \cdot d \quad (1),$$

where ω—number of coil turns;
d—mean coil diameter, m;
κ—coefficient which depends on ratio of coil width to mean coil diameter (determined from diagram).

Black circles of small diameter (see FIG. 4 and FIG. 5) show contact areas of metalized openings with continuous metallization which realize electrical connections between conductors situated on both sides of fixed 2 disc. Indicated above through openings diameter may be 50 mcm and contact areas diameter-100 mcm.

Radial breadth of concentric connecting conductors in the form of rings may be 50 mcm and radial distance between middle circumferences of two neighboring concentric connecting conductors-100 mcm.

In order edge effect do not practically influence the measuring result it is necessary that edge of operation section situated on movable 1 disc does not come to the edge of operation section situated on fixed 2 disc closer than 10·h.

Where h—distance between movable 1 and fixed 2 discs which may be 80 mcm.

The indicated area of edge effect is situated inside angular sector equal to 3.5 degrees (interval between neighboring sections has small angular width). Dashed lines in FIG. 7 and FIG. 8 indicate edge effect areas at angular displacement measuring ($\alpha°$).

Diameter of internal circumference limiting four sections of common 5 electrode of the fourth 10, the fifth 11 and the sixth 12 oscillating circuits located on movable 1 disc is basic and determines radial dimensions of movable 1 and fixed 2 discs. At distance between movable 1 and fixed 2 discs equal to 80 mm the indicated basic diameter may be 33 mm.

Radial breadth of sections situated on facing each other sides of movable 1 and fixed 2 discs (depends on distance between movable 1 and fixed 2 discs) may be correspondingly 1 mm and 3 mm Distance between neighboring sections by internal circumference limiting the indicated sections on fixed 2 disc may be 5 mcm.

Diameter of movable 1 and fixed 2 disc may be 50 mm

Signal conversion unit 6 is provided with flat spiral of inductance coil 30 for injecting energy into the first 7 oscillating circuit (see FIG. 4), flat spiral of inductance coil 31 for injecting energy into the second 8 oscillating circuit, flat spiral of inductance coil 32 for injecting energy into the third 9 oscillating circuit, flat spiral of inductance coil 33 for injecting energy into the fourth 10 oscillating circuit, flat spiral of inductance coil 34 for injecting energy into the fifth 11 oscillating circuit, flat spiral of inductance coil 35 for injecting energy into the sixth 12 oscillating circuit, flat spiral of inductance coil 36 for reading the resonant oscillation frequency of the first 7 oscillating circuit, flat spiral of inductance coil 37 for reading the resonant oscillation frequency of the second 8 oscillating circuit, flat spiral of inductance coil 38 for reading the resonant oscillation frequency of the third 9 oscillating circuit, flat spiral of inductance coil 39 for reading the resonant oscillation frequency of the fourth 10 oscillating circuit, flat spiral of inductance coil 40 for reading the resonant oscillation frequency of the fifth 11 oscillating circuit and flat spiral of inductance coil 41 for reading the resonant oscillation frequency of the sixth 12 oscillating circuit, which are situated by circumference on external side 42 of fixed 2 disc near its central opening.

Figure 4:
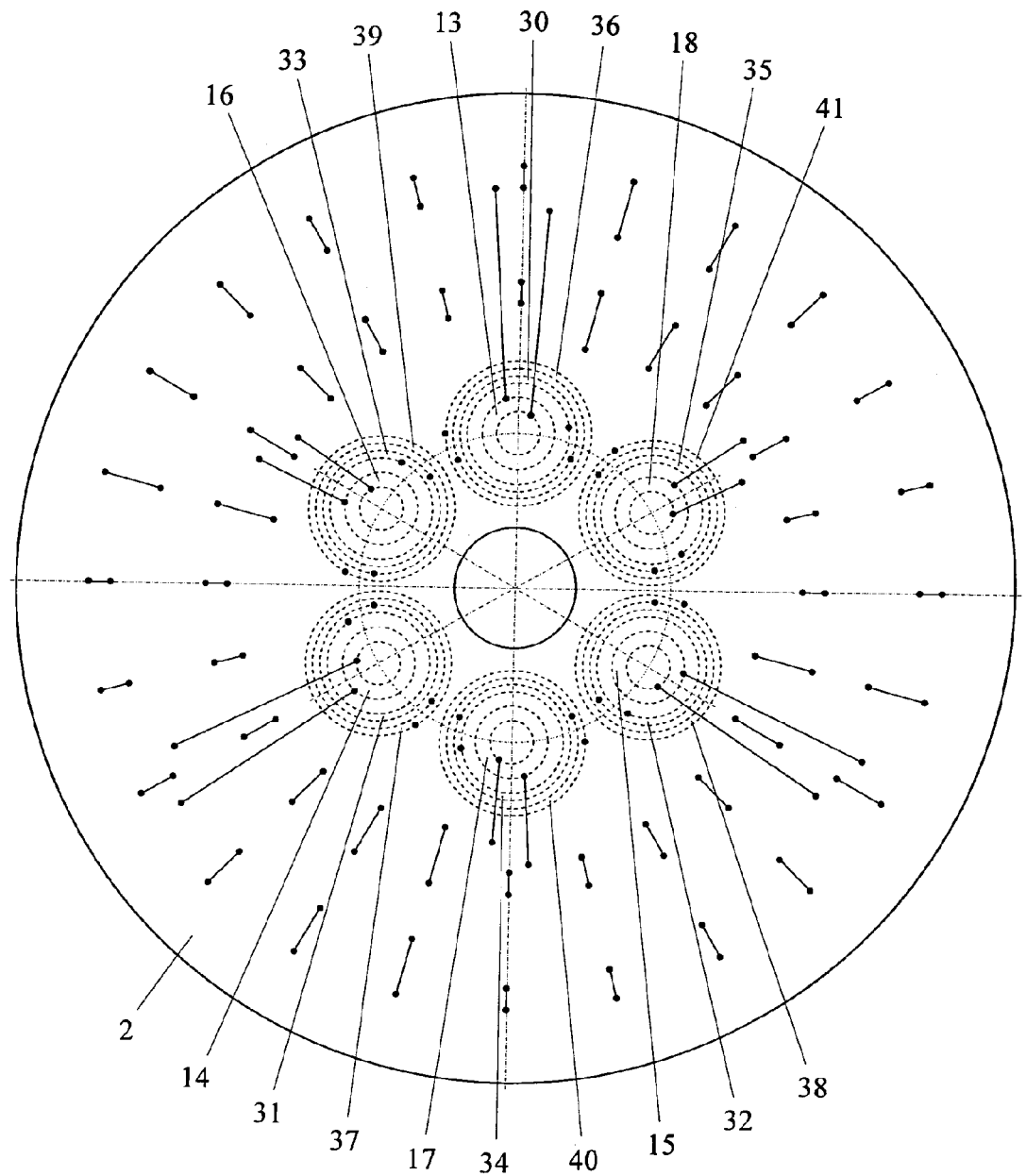
FIG. 4 shows a view of fixed disc from external side.

In FIG. 4 beginnings and ends (shown by black circles of small diameter) of flat spirals of inductance coils of six oscillating circuits, flat spirals of inductance coils for injecting energy into six oscillating circuits and flat spirals of inductance coils for reading the resonant oscillation frequency of six oscillating circuits are situated correspondingly on external and internal circumferences (shown by dashed lines), limiting the indicated flat spirals of inductance coils.

Signal conversion unit 6 additionally comprises computing device (in FIG. 2 and FIG. 3 not shown), the first 58 ILI element, the second 59 ILI element, the third 60 ILI element, the fourth 61 ILI element, the fifth 62 ILI element, the sixth 63 ILI element, the first 64 transistor, the second 65 transistor, the third 66 transistor, the fourth 67 transistor, the fifth 68 transistor, the sixth 69 transistor, the first 70 comparator, the second 71 comparator, the third 72 comparator, the fourth 73 comparator, the fifth 74 comparator and the sixth 75 comparator.

The indicated above transistors are transistors of n-p-n type.

The beginning 76 of flat spiral of inductance coil 30 for injecting energy into the first 7 oscillating circuit is connected to positive outlet 77 of power, the end 78 of flat spiral of inductance coil 30 for injecting energy into the first 7 oscillating circuit is connected to collector of the first 64 transistor, the beginning 79 of flat spiral of inductance coil 31 for injecting energy into the second 8 oscillating circuit is connected to positive outlet 77 of power, the end 80 of flat spiral of inductance coil 31 for injecting energy into the second 8 oscillating circuit is connected to collector of the second 65 transistor, the beginning 81 of flat spiral of inductance coil 32 for injecting energy into the third 9 oscillating circuit is connected to positive outlet 77 of power, the end 82 of flat spiral of inductance coil 32 for injecting energy into the third 9 oscillating circuit is connected to collector of the third 66 transistor, the beginning 83 of flat spiral of inductance coil 33 for injecting energy into the fourth 10 oscillating circuit is connected to positive outlet 77 of power, the end 84 of flat spiral of inductance coil 33 for injecting energy into the fourth 10 oscillating circuit is connected to collector of the fourth 67 transistor, the beginning 85 of flat spiral of inductance coil 34 for injecting energy into the fifth 11 oscillating circuit is connected to positive outlet 77 of power, the end 86 of flat spiral of inductance coil 34 for injecting energy into the fifth 11 oscillating circuit is connected to collector of the fifth 68 transistor, the beginning 87 of flat spiral of inductance coil 35 for injecting energy into the sixth 12 oscillating circuit is connected to positive outlet 77 of power, the end 88 of flat spiral of inductance coil 35 for injecting energy into the sixth 12 oscillating circuit is connected to collector of the sixth 69 transistor.

The beginning 89 of flat spiral of inductance coil 36 for reading the resonant oscillation frequency of the first 7 oscillating circuit is connected to direct inlet of the first 70 comparator, on inverting inlet of which reference voltage is supplied, the end 90 of flat spiral of inductance coil 36 for reading the resonant oscillation frequency of the first 7 oscillating circuit is connected to "common" power outlet, the beginning 91 of flat spiral of inductance coil 37 for reading the resonant oscillation frequency of the second 8 oscillating circuit is connected to direct inlet of the second 71 comparator, on inverting inlet of which reference voltage is supplied, the end 92 of flat spiral of inductance coil 37 for reading the resonant oscillation frequency of the second 8 oscillating circuit is connected to "common" power outlet, the beginning 93 of flat spiral of inductance coil 38 for reading the resonant oscillation frequency of the third 9 oscillating circuit is connected to direct inlet of the third 72 comparator, on inverting inlet of which reference voltage is supplied, the end 94 of flat spiral of inductance coil 38 for reading the resonant oscillation frequency of the third 9 oscillating circuit is connected to "common" power outlet, the beginning 95 of flat spiral of inductance coil 39 for reading the resonant oscillation frequency of the fourth 10 oscillating circuit is connected to direct inlet of the fourth 73 comparator, on inverting inlet of which reference voltage is supplied, the end 96 of flat spiral of inductance coil 39 for reading the resonant oscillation frequency of the fourth 10 oscillating circuit is connected to "common" power outlet, the beginning 97 of flat spiral of inductance coil 40 for reading the resonant oscillation frequency of the fifth 11 oscillating circuit is connected to direct inlet of the fifth 74 comparator, on inverting inlet of which reference voltage is supplied, the end 98 of flat spiral of inductance coil 40 for reading the resonant oscillation frequency of the fifth 11 oscillating circuit is connected to "common" power outlet, the beginning 99 of flat spiral of inductance coil 41 for reading the resonant oscillation frequency of the sixth 12 oscillating circuit is connected to direct inlet of the sixth 75 comparator, on inverting inlet of which reference voltage is supplied, the end 100 of flat spiral of inductance coil 41 for reading the resonant oscillation frequency of the sixth 12 oscillating circuit is connected to "common" power outlet.

The first inlet 101 of the first 58 ILI element, the first inlet 102 of the second 59 ILI element, the first inlet 103 of the third 60 ILI element, the first inlet 104 of the fourth 61 ILI element, the first inlet 105 of the fifth 62 ILI element and the first inlet 106 the sixth 63 ILI element are inlets of starting of uninterrupted undamped resonance oscillations correspondingly of the first 7, the second 8, the third 9, the fourth 10, the fifth 11 and the sixth 12 oscillating circuits.

Outlet of the first 58 ILI element, outlet of the second 59 ILI element, outlet of the third 60 ILI element, outlet of the fourth 61 ILI element, outlet of the fifth 62 ILI element and outlet of the sixth 63 ILI element are connected correspondingly with the base of the first 64 transistor, base of the second 65 transistor, base of the third 66 transistor, base of the fourth 67 transistor, base of the fifth 68 transistor and base of the sixth 69 transistor.

Emitter of the first 64 transistor, emitter of the second 65 transistor, emitter of the third 66 transistor, emitter of the fourth 67 transistor, emitter of the fifth 68 transistor and emitter of the sixth 69 transistor are connected to "common" power outlet.

Outlet of the first 70 comparator, outlet of the second 71 comparator, outlet of the third 72 comparator, outlet of the fourth 73 comparator, outlet of the fifth 74 comparator and outlet of the sixth 75 comparator are connected correspondingly to the second inlet of the first 58 ILI element, the second inlet of the second 59 ILI element, the second inlet of the third 60 ILI element, the second inlet of the fourth 61 ILI element, the second inlet of the fifth 62 ILI element and the second inlet of the sixth 63 ILI element.

Outlet of the first 70 comparator, outlet of the second 71 comparator, outlet of the third 72 comparator, outlet of the fourth 73 comparator, outlet of the fifth 74 comparator and outlet of the sixth 75 comparator are connected to computing device of signal conversion unit 6.

Signal conversion unit 6 elements, except computing device, may be situated on external side 42 of fixed 2 disc.

Incremental capacitive angular displacement transducer execution variant is possible (not shown) with reduced radial size which may be applied, for example, in gyroscopes of aircrafts.

In this case movable and fixed discs directly contact each other (small hollow in the form of ring is made on movable disc surface facing fixed disc). There is lubricant between movable and fixed discs.

Distance between conductors produced by print method on facing each other sides of movable and fixed discs may be from 10 mcm and up to 20 mcm. Due to this base internal smaller diameter circumference diameter decreases of four sections of common electrode of three oscillating circuits on movable disc, and therefore radial sizes of movable and fixed discs. Radial breadth of sections situated on facing each other sides of movable and fixed discs (depends on distance between movable and fixed discs), may be correspondingly 0.2 mm and 0.6 mm Six flat spirals of inductance coils of six oscillating circuits may have the following parameters:

Mean diameter of flat spiral of inductance coil—5 mm;
Number of turns—50;
Turn width—20 mcm;
Interval between turns—10 mcm;
Inductance—16 mcHn.

Copper conductors thickness produced by print method on external side of fixed disc may be 15 mcm.

Movable and fixed discs diameter may be 30 mm

In the general case inductance coils of six oscillating circuits, inductance coils for injecting energy into six oscillating circuits and inductance coils for reading the resonant oscillation frequency of six oscillating circuits may be produced by wire coiling in the same way on six dielectric frames and situated on external side 42 of fixed 2 disc. Capacities, inductances and electrical resistances of inductance coils of six oscillating circuits will be almost equal.

Due to this increase of Q-factor of six oscillating circuits is possible.

System Works in the Following Way.

After power switching on singular positive pulses come from parallel channel of computing device (in FIG. 2 and FIG. 3 not shown) of signal conversion unit 6 to the first inlet 101 of the first 58 ILI element, the first inlet 102 of the second 59 ILI element, the first inlet 103 of the third 60 ILI element, the first inlet 104 of the fourth 61 ILI element, the first inlet 105 of the fifth 62 ILI element and the first inlet 106 of the sixth 63 ILI element.

Positive pulses come to base of the first 64 transistor, to base of the second 65 transistor, to base of the third 66 transistor, to base of the fourth 67 transistor, to base of the fifth 68 transistor and to base of the sixth 69 transistor, these pulses open the indicated transistors. Due to this currents starts to flow through flat spiral of inductance coil 30 for injecting energy into the first 7 oscillating circuit, flat spiral of inductance coil 31 for injecting energy into the second 8 oscillating circuit, flat spiral of inductance coil 32 for injecting energy into the third 9 oscillating circuit, flat spiral of inductance coil 33 for injecting energy into the fourth 10 oscillating circuit, flat spiral of inductance coil 34 for injecting energy into the fifth 11 oscillating circuit and flat spiral of inductance coil 35 for injecting energy into the sixth 12 oscillating circuit, these currents cause EIF—electromotive induction forces in the first 7, the second 8, the third 9, the fourth 10, the fifth 11 and the sixth 12 oscillating circuits where electromagnetic field resonance oscillations arise.

Resonant oscillations frequencies of the first 7, the second 8, the third 9, the fourth 10, the fifth 11 and the sixth 12 oscillating circuits are measured by taking off information from flat spiral of inductance coil 36 for reading the resonant oscillation frequency of the first 7 oscillating circuit, flat spiral of inductance coil 37 for reading the resonant oscillation frequency of the second 8 oscillating circuit, flat spiral of inductance coil 38 for reading the resonant oscillation frequency of the third 9 oscillating circuit, flat spiral of inductance coil 39 for reading the resonant oscillation frequency of the fourth 10 oscillating circuit, flat spiral of inductance coil 40 for reading the resonant oscillation frequency of the fifth 11 oscillating circuit and flat spiral of inductance coil 41 for reading the resonant oscillation frequency of the sixth 12 oscillating circuit.

From output of the first 70 comparator, output of the second 71 comparator, output of the third 72 comparator, output of the fourth 73 comparator, output of the fifth 74 comparator and output of the sixth 75 comparator positive signals of rectangular shape come correspondingly to the second inlet of the first 58 ILI element, the second inlet of the second 59 ILI element, the second inlet of the third 60 ILI element, the second inlet of the fourth 61 ILI element, the second inlet of the fifth 62 ILI element and the second inlet of the sixth 63 ILI element (zero levels are supplied at this time to the first inlets of the indicated ILI elements), and also to computing device (on FIG. 2 and FIG. 3 not shown) of signal conversion unit 6.

Rectangular pulses come from outlet of the first 58 ILI element, outlet of the second 59 ILI element, outlet of the third 60 ILI element, outlet of the fourth 61 ILI element, outlet of the fifth 62 ILI element and outlet of the sixth 63 ILI element correspondingly to base of the first 64 transistor, to base of the second 65 transistor, to base of the third 66 transistor, to base of the fourth 67 transistor, to base of the fifth 68 transistor and to base of the sixth 69 transistor.

At the indicated transistors opening through flat spiral of inductance coil 30 for injecting energy into the first 7 oscillating circuit, flat spiral of inductance coil 31 for injecting energy into the second 8 oscillating circuit, flat spiral of inductance coil 32 for injecting energy into the third 9 oscillating circuit, flat spiral of inductance coil 33 for injecting energy into the fourth 10 oscillating circuit, flat spiral of inductance coil 34 for injecting energy into the fifth 11 oscillating circuit and flat spiral of inductance coil 35 for injecting energy into the sixth 12 oscillating circuit currents flow at which changing in the first 7, the second 8, the third 9, the fourth 10, the fifth 11 and the sixth 12 oscillating circuits EIF inductions arise.

Under EIF induction influence in the first 7, the second 8, the third 9, the fourth 10, the fifth 11 and the sixth 12 oscillating circuits currents arise harmonious with direction of currents in flat spiral of inductance coil 30 for injecting energy into the first 7 oscillating circuit, flat spiral of inductance coil 31 for injecting energy into the second 8 oscillating circuit, flat spiral of inductance coil 32 for injecting energy into the third 9 oscillating circuit, flat spiral of inductance coil 33 for injecting energy into the fourth 10 oscillating circuit, flat spiral of inductance coil 34 for injecting energy into the fifth 11 oscillating circuit and flat spiral of inductance coil 35 for injecting energy into the sixth 12 oscillating circuit in each oscillations half-period of the indicated oscillating circuits.

During positive oscillations half-period energy is injected into the first 7, the second 8, the third 9, the fourth 10, the fifth 11 and the sixth 12 oscillating circuits during current increase in flat spiral of inductance coil 30 for injecting energy into the first 7 oscillating circuit, flat spiral of inductance coil 31 for injecting energy into the second 8 oscillating circuit, flat spiral of inductance coil 32 for injecting energy into the third 9 oscillating circuit, flat spiral of inductance coil 33 for injecting energy into the fourth 10 oscillating circuit, flat spiral of inductance coil 34 for injecting energy into the fifth 11 oscillating circuit and flat spiral of inductance coil 35 for injecting energy into the sixth 12 oscillating circuit, and during negative oscillations half-period energy is injected during current decrease.

As energy transfer into the first 7, the second 8, the third 9, the fourth 10, the fifth 11 and the sixth 12 oscillating circuits takes place at the moments of current change in flat spiral of inductance coil 30 for injecting energy into the first 7 oscillating circuit, flat spiral of inductance coil 31 for injecting energy into the second 8 oscillating circuit, flat spiral of inductance coil 32 for injecting energy into the third 9 oscillating circuit, flat spiral of inductance coil 33 for injecting energy into the fourth 10 oscillating circuit, flat spiral of inductance coil 34 for injecting energy into the fifth 11 oscillating circuit and flat spiral of inductance coil 35 for injecting energy into the sixth 12 oscillating circuit.

Thus, continuous undamped resonant oscillations of electromagnetic field are excited in the first 7, the second 8, the third 9, the fourth 10, the fifth 11 and the sixth 12 oscillating circuits with energy injecting at certain points of time, amplitude of oscillations is increased at that points and resonant oscillation frequency is determined of the first 7, the second 8, the third 9, the fourth 10, the fifth 11 and the sixth 12 oscillating circuits.

Stated above variant of simultaneous excitement of resonant oscillations in six oscillating circuits is used at electromagnetic compatibility of any two oscillating circuits among themselves, flat spirals of inductance coils of which situated next to each other by circumference on external side 42 of fixed 2 disc.

Figure 7:
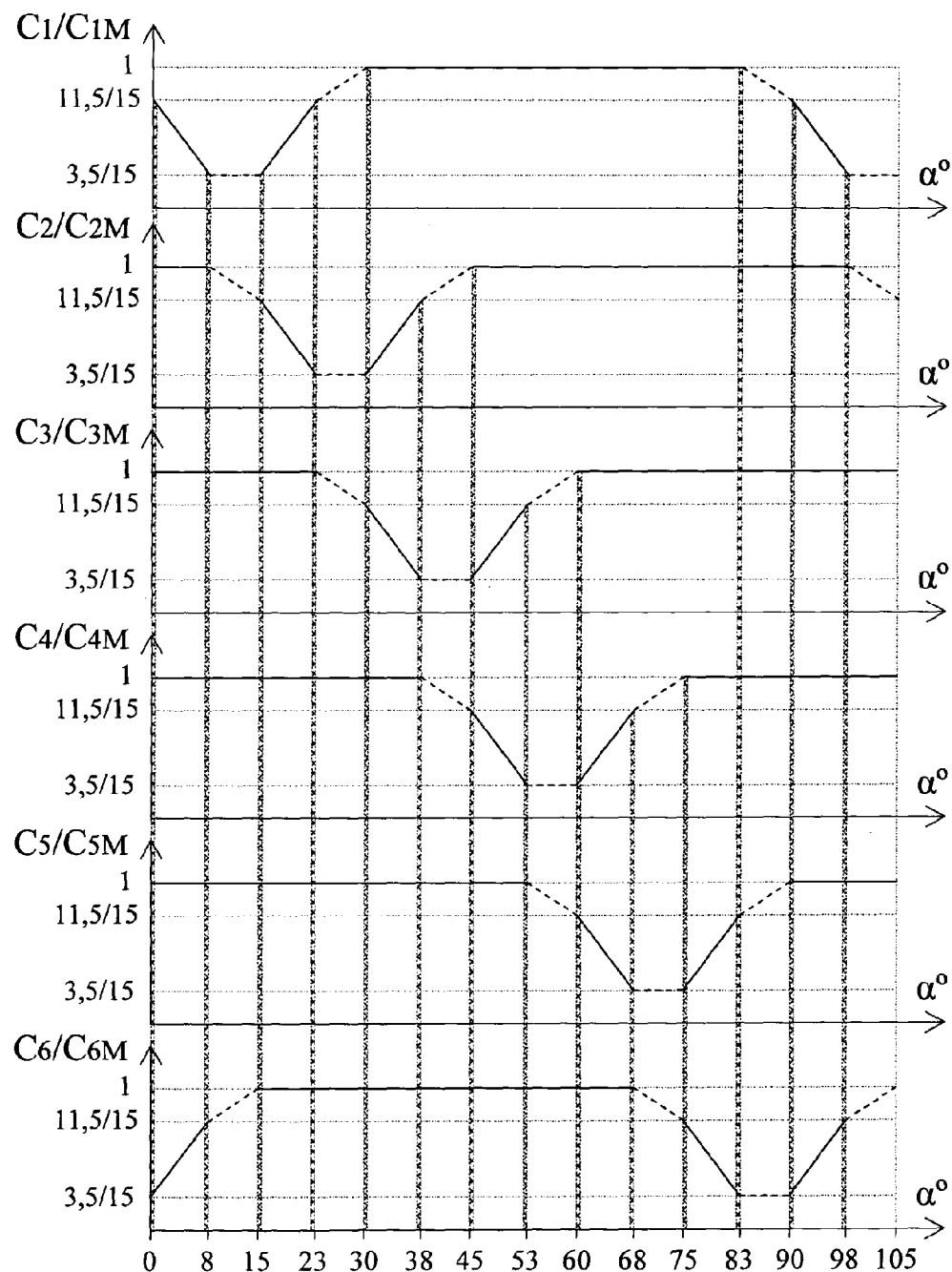
FIG. 7 is a diagram of capacities state between sections of electrodes of the first, the second and the third oscillating circuits at movable disc rotation.
Figure 8:
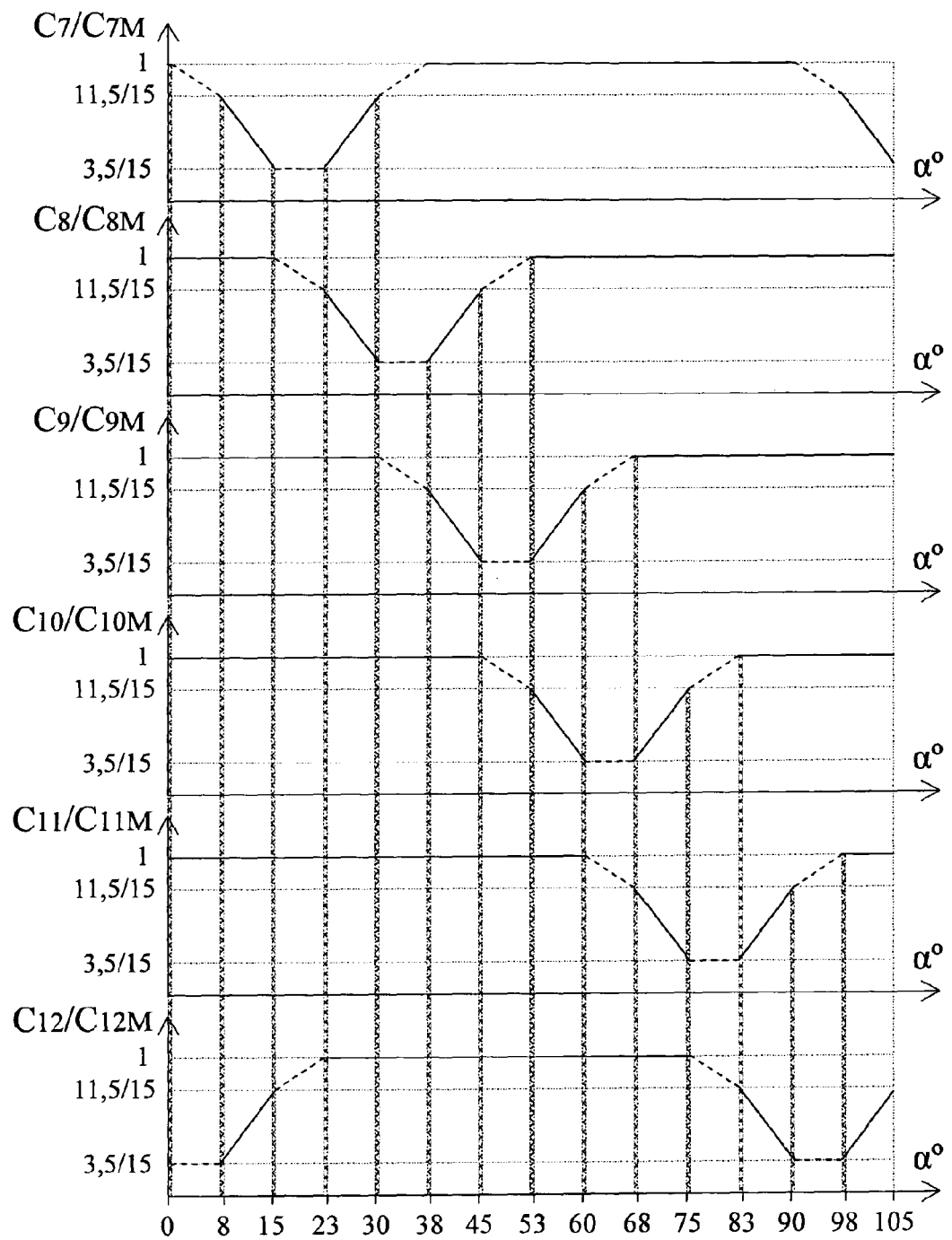
FIG. 8 is a diagram of capacities state between sections of electrodes of the fourth, the fifth and the sixth oscillating circuits at movable disc rotation.

In FIG. 7 and FIG. 8 double hatch shows areas of measuring ranges overlap of the first 7, the second 8, the third 9 oscillating circuits and the fourth 10, the fifth 11, the sixth 12 oscillating circuits. Inside measuring ranges overlap area which is 0.5 degree wide, switching (transfer of angular displacement measuring) takes place from the first 7, the second 8 and the third 9 oscillating circuits to the fourth 10, the fifth 11 and the sixth 12 oscillating circuits and inversely.

In general case with the aim of electromagnetic compatibility of six oscillating circuits among each other (particularly at small, for example 50 mm or 30 mm diameters of movable 1 and fixed 2 discs) separate resonant oscillations excitement is preferable initially in the first 7, the second 8 and the third 9 oscillating circuits, and then in the fourth 10, the fifth 11 and the sixth 12 oscillating circuits and vice versa. Separate resonant oscillations excitement is realized in areas of measuring range overlap of the indicated oscillating circuits and for a short period of time which practically doesn't affect transducer performance (number of angular displacement readings per time unit).

At separate electromagnetic field resonant oscillation excitement after power turning on from computing device parallel channel of signal conversion unit 6 to the first inlet 104 of the fourth 61 ILI element, the first inlet 105 of the fifth 62 ILI element and the first inlet 106 of the sixth 63 ILI element one levels are supplied (disable electromagnetic field resonant oscillation excitement in the fourth 10, the fifth 11 and the sixth 12 oscillating circuits), and to the first inlet 101 of the first 58 ILI element, the first inlet 102 of the second 59 ILI element and the first inlet 103 of the third 60 ILI element zero levels are supplied and then single positive pulses. Due to this electromagnetic field resonant oscillation excitement occurs in the first 7, the second 8 and the third 9 oscillating circuits.

At angular displacement of movable 1 disc relative to fixed 2 disc (angular displacement direction is shown in FIG. 5 by arrow), within range from 7.5 to 8 degrees (see FIG. 7 and FIG. 8), from computing device parallel channel of signal conversion unit 6 to the first inlet 101 of the first 58 ILI element, the first inlet 102 of the second 59 ILI element and the first inlet 103 of the third 60 ILI element one levels are supplied (disable electromagnetic field resonant oscillation excitement in the first 7, the second 8 and the third 9 oscillating circuits), and to the first inlet 104 of the fourth 61 ILI element, the first inlet 105 of the fifth 62 ILI element and the first inlet 106 of the sixth 63 ILI element zero levels are supplied and then single positive pulses. Due to this electromagnetic field resonant oscillation excitement occurs in the fourth 10, the fifth 11 and the sixth 12 oscillating circuits.

At angle displacement of movable 1 disc relative to fixed 2 disc within the range from 15 to 15.5 degrees from computing device parallel channel of signal conversion unit 6 to the first inlet 104 of the fourth 61 ILI element, the first inlet 105 of the fifth 62 ILI element and the first inlet 106 of the sixth 63 ILI element one levels are supplied (disable electromagnetic field resonant oscillation excitement in the fourth 10, the fifth 11 and the sixth 12 oscillating circuits), and to the first inlet 101 of the first 58 ILI element, the first inlet 102 of the second 59 ILI element and the first inlet 103 of the third 60 ILI element zero levels are supplied and then single positive pulses. Due to this repeated electromagnetic field resonant oscillation excitement occurs in the first 7, the second 8 and the third 9 oscillating circuit and so on.

It is known that oscillating circuit natural frequency (see I. V. Saveliev General Physics Course, vol. 1, vol. 2.—M.: Nauka, 1978, this book is designated as literature {1}) is determined by formula $$\omega 0 = 1/(L \cdot C)^{1/2} \qquad (2), \text{literature } \{1\}, \text{vol. 2, p. 254,}$$

where $\omega 0$—oscillating circuit natural frequency (circular or cyclic frequency);

L—oscillating circuit inductance;
C—oscillating circuit capacity.

Oscillating circuit period of oscillation is equal to $$T = (2 \cdot \pi) \omega 0 \qquad (3), \text{literature } \{1\}, \text{vol. 1, p. 193,}$$

where $\pi = 3.14 \ldots$ $$f = 1/T \qquad (4), \text{literature } \{1\}, \text{vol. 1, p. 193,}$$

where f—oscillation frequency.

Taking into account active (electrical) resistance the real oscillating circuit resonant oscillation frequency is determined by formula $$\omega = [1/(L \cdot C) - R^2/(2 \cdot L)^2]^{1/2} \qquad (5), \text{literature } \{1\}, \text{vol. 2, p. 255,}$$

where $\omega$—real oscillating circuit resonant oscillation frequency (circular or cyclic frequency);

R—active (electrical) resistance of oscillating circuit.

At $1/(L \cdot C)$ much more than $R^2/(2 \cdot L)^2$, it could be supposed $$\omega = \omega_0 = 1/(L \cdot C)^{1/2} \qquad (6), \text{literature } \{1\}, \text{vol. 2, p. 257.}$$

Oscillating circuit period of oscillation by Thomson formula is equal to $$T = 2 \cdot \pi (L \cdot C)^{1/2} \qquad (7), \text{literature } \{1\}, \text{vol. 2, p. 254.}$$

Further period of oscillation of the first 7, the second 8, the third 9, the fourth 10, the fifth 11 and the sixth 12 oscillating circuits will be determined by Thomson formula.

Period of oscillation of the first 7 oscillating circuit is equal to $$T_1 = 2 \cdot \pi \{L_1 \cdot [C_{01} + (C_1 \cdot C_4)/(C_1 + C_4)]\}^{1/2} \qquad (8),$$

where $L_1$—inductance of the first 7 oscillating circuit;
$C_{01}$—constant component of capacity of the first 8 oscillating circuit;
$C_1$—capacity between four sections of the first 3 electrode of the first 7 oscillating circuit and common electrode 4 of the first 7, the second 8 and the third 9 oscillating circuits;
$C_4$—capacity between four sections of the second 19 electrode of the first 7 oscillating circuit and common electrode 4 of the first 7, the second 8 and the third 9 oscillating circuits.

Period of oscillation of the second 8 oscillating circuit is equal to $$T_2 = 2 \cdot \pi \{L_2 \cdot [C_{02} + (C_2 \cdot C_5)/(C_2 + C_5)]\}^{1/2} \qquad (9),$$

where $L_2$—inductance of the second 8 oscillating circuit;
$C_{02}$—constant component of capacity of the second 8 oscillating circuit;
$C_2$—capacity between four sections of the first 20 electrode of the second 8 oscillating circuit and common electrode 4 of the first 7, the second 8 and the third 9 oscillating circuits;
$C_5$—capacity between four sections of the second 21 electrode of the second 8 oscillating circuit and common electrode 4 of the first 7, the second 8 and the third 9 oscillating circuits.

Period of oscillation of the third 9 oscillating circuit is equal to $$T_3 = 2 \cdot \pi \{L_3 \cdot [C_{03} + (C_3 \cdot C_6)/(C_3 + C_6)]\}^{1/2} \qquad (10),$$

where $L_3$—inductance of the third 9 oscillating circuit;
$C_{03}$—constant component of capacity of the third 9 oscillating circuit;
$C_3$—capacity between four sections of the first 22 electrode of the third 9 oscillating circuit and common electrode 4 of the first 7, the second 8 and the third 9 oscillating circuits;
$C_6$—capacity between four sections of the second 23 electrode of the third 9 oscillating circuit and common electrode 4 of the first 7, the second 8 and the third 9 oscillating circuits.

The first 7, the second 8 and the third 9 oscillating circuits are produced so that constant component of capacities and inductances of the indicated oscillating circuits are almost equal to each other $$C_{01} = C_{02} = C_{03} \qquad (11),$$

$$L_1 = L_2 = L_3 \qquad (12).$$

At angular displacement of movable 1 disc relative to fixed 2 disc the following equalities are executed $$C_{1M} = C_{2M} = C_{3M} = C_{4M} = C_{5M} = C_{6M} \qquad (13),$$

where $C_{1M}$—maximum capacity between four sections of the first 3 electrode of the first 7 oscillating circuit and common electrode 4 of the first 7, the second 8 and the third 9 oscillating circuits;
$C_{2M}$—maximum capacity between four sections of the first 20 electrode of the second 8 oscillating circuit and common electrode 4 of the first 7, the second 8 and the third 9 oscillating circuits;
$C_{3M}$—maximum capacity between four sections of the first 22 electrode of the third 9 oscillating circuit and common electrode 4 of the first 7, the second 8 and the third 9 oscillating circuits;
$C_{4M}$—maximum capacity between four sections of the second 19 electrode of the first 7 oscillating circuit and common electrode 4 of the first 7, the second 8 and the third 9 oscillating circuits;
$C_{5M}$—maximum capacity between four sections of the second 21 electrode of the second 8 oscillating circuit and common electrode 4 of the first 7, the second 8 and the third 9 oscillating circuits;
$C_{6M}$—maximum capacity between four sections of the second 23 electrode of the third 9 oscillating circuit and common electrode 4 of the first 7, the second 8 and the third 9 oscillating circuits.

Period of oscillation of the fourth 10 oscillating circuit is equal to $$T_4 = 2 \cdot \pi \{L_4 \cdot [C_{04} + (C_7 \cdot C_{10})/(C_7 + C_{10})]\}^{1/2} \qquad (14),$$

where $L_4$—inductance of the fourth 10 oscillating circuit;
$C_{04}$—constant component of capacity of the fourth 10 oscillating circuit;
$C_7$—capacity between four sections of the first 24 electrode of the fourth 10 oscillating circuit and common electrode 5 of the fourth 10, the fifth 11 and the sixth 12 oscillating circuits;

$C_{10}$—capacity between four sections of the second 25 electrode of the fourth 10 oscillating circuit and common electrode 5 of the fourth 10, the fifth 11 and the sixth 12 oscillating circuits.

Period of oscillation of the fifth 11 oscillating circuit is equal to $$T_5 = 2\pi\{L_5 \cdot [C_{05} + (C_8 \cdot C_{11})/(C_8 + C_{11})]\}^{1/2} \tag{15},$$

where $L_5$—inductance of the fifth 11 oscillating circuit;

$C_{05}$—constant component of capacity of the fifth 11 oscillating circuit;

$C_8$—capacity between four sections of the first 26 electrode of the fifth 11 oscillating circuit and common electrode 5 of the fourth 10, the fifth 11 and the sixth 12 oscillating circuits;

$C_{11}$—capacity between four sections of the second 27 electrode of the fifth 11 oscillating circuit and common electrode 5 of the fourth 10, the fifth 11 and the sixth 12 oscillating circuits.

Period of oscillation of the sixth 12 oscillating circuit is equal to $$T_6 = 2\pi\{L_6 \cdot [C_{06} + (C_9 \cdot C_{12})/(C_9 + C_{12})]\}^{1/2} \tag{16},$$

where $L_6$—inductance of the sixth 12 oscillating circuit;

$C_{06}$—constant component of capacity of the sixth 12 oscillating circuit;

$C_9$—capacity between four sections of the first 28 electrode of the sixth 12 oscillating circuit and common electrode 5 of the fourth 10, the fifth 11 and the sixth 12 oscillating circuits;

$C_{12}$—capacity between four sections of the second 29 electrode of the sixth 12 oscillating circuit and common electrode 5 of the fourth 10, the fifth 11 and the sixth 12 oscillating circuits.

The fourth 10, the fifth 11 and the sixth 11 oscillating circuits are produced so that constant components of capacities and inductances of the indicated oscillating circuits are almost equal to each other $$C_{04} = C_{05} = C_{06} \tag{17},$$

$$L_4 = L_5 = L_6 \tag{18}.$$

At angular displacement of movable 1 disc relative to fixed 2 disc the following equalities are executed $$C_{7M} = C_{8M} = C_{9M} = C_{10M} = C_{11M} = C_{12M} \tag{19},$$

where $C_{7M}$—maximum capacity between four sections of the first 24 electrode of the fourth 10 oscillating circuit and common electrode 5 of the fourth 10, the fifth 11 and the sixth 12 oscillating circuits;

$C_{8M}$—maximum capacity between four sections of the first 26 electrode of the fifth 11 oscillating circuit and common electrode 5 of the fourth 10, the fifth 11 and the sixth 12 oscillating circuits;

$C_{9M}$—maximum capacity between four sections of the first 28 electrode of the sixth 12 oscillating circuit and common electrode 5 of the fourth 10, the fifth 11 and the sixth 12 oscillating circuits;

$C_{10M}$—maximum capacity between four sections of the second 25 electrode of the fourth 10 oscillating circuit and common electrode 5 of the fourth 10, the fifth 11 and the sixth 12 oscillating circuits;

$C_{11M}$—maximum capacity between four sections of the second 27 electrode of the fifth 11 oscillating circuit and common electrode 5 of the fourth 10, the fifth 11 and the sixth 12 oscillating circuits;

$C_{12M}$—maximum capacity between four sections of the second 29 electrode of the sixth 12 oscillating circuit and common electrode 5 of the fourth 10, the fifth 11 and the sixth 12 oscillating circuits.

Let's introduce the following designations into equalities (11), (12), (13), (17), (18) and (19)

$$C_{0A} = C_{01} = C_{02} = C_{03} \tag{20},$$

$$L_A = L_1 = L_2 = L_3 \tag{21},$$

$$C_{AM} = C_{1M} = C_{2M} = C_{3M} = C_{4M} = C_{5M} = C_{6M} \tag{22},$$

$$C_{0B} = C_{04} = C_{05} = C_{06} \tag{23},$$

$$L_B = L_4 = L_5 = L_6 \tag{24},$$

$$C_{BM} = C_{7M} = C_{8M} = C_{9M} = C_{10M} = C_{11M} = C_{12M} \tag{25}.$$

Formulas (8), (9) and (10) taking into account equalities (20), (21) and (22) depending on the amount of angular displacement of movable 1 disc relative to fixed 2 disc (see FIG. 7) may be presented in the form:

In measurement range from 0 to 8 degrees $$T_1 = 2\pi\{L_A \cdot [C_{0A} + (C_1 \cdot C_{AM})/(C_1 + C_{AM})]\}^{1/2} \tag{26},$$

$$T_2 = 2\pi\{L_A \cdot [C_{0A} + (C_{AM} \cdot C_{AM})/(C_{AM} + C_{AM})]\}^{1/2} \tag{27},$$

$$T_3 = 2\pi\{L_A \cdot [C_{0A} + (C_{AM} \cdot C_6)/(C_{AM} + C_6)]\}^{1/2} \tag{28}.$$

In measurement range from 15 to 23 degrees $$T_1 = 2\pi\{L_A \cdot [C_{0A} + (C_1 \cdot C_{AM})/(C_1 + C_{AM})]\}^{1/2} \tag{29},$$

$$T_2 = 2\pi\{L_A \cdot [C_{0A} + (C_2 \cdot C_{AM})/(C_2 + C_{AM})]\}^{1/2} \tag{30},$$

$$T_3 = 2\pi\{L_A \cdot [C_{0A} + (C_{AM} \cdot C_{AM})/(C_{AM} + C_{AM})]\}^{1/2} \tag{31}.$$

In measurement range from 30 to 38 degrees $$T_1 = 2\pi\{L_A \cdot [C_{0A} + (C_{AM} \cdot C_{AM})/(C_{AM} + C_{AM})]\}^{1/2} \tag{32},$$

$$T_2 = 2\pi\{L_A \cdot [C_{0A} + (C_2 \cdot C_{AM})/(C_2 + C_{AM})]\}^{1/2} \tag{33},$$

$$T_3 = 2\pi\{L_A \cdot [C_{0A} + (C_3 \cdot C_{AM})/(C_3 + C_{AM})]\}^{1/2} \tag{34}.$$

Computing device of signal conversion unit 6 depending on amount of angular displacement of movable 1 disc relative to fixed 2 disc (see FIG. 7) calculates the following expressions:

In measurement t range from 0 to 8 degrees $$(T_2^2 - T_1^2)/(T_2^2 - T_3^2) = [C_{AM}/2 - (C_1 \cdot C_{AM})/(C_1 + C_{AM})]// \tag{35}$$
$$[C_{AM}/2 - (C_{AM} \cdot C_6)/(C_{AM} + C_6)] =$$
$$= [(C_{AM} - C_1)/(C_{AM} + C_1)]/[(C_{AM} - C_6)/(C_{AM} + C_6)].$$

In measurement range from 15 to 23 degrees $$(T_3^2 - T_1^2)/(T_3^2 - T_2^2) == \tag{36}$$
$$[(C_{AM} - C_1)/(C_{AM} + C_1)]/[(C_{AM} - C_2)/(C_{AM} + C_2)].$$

In measurement range from 30 to 38 degrees $$(T_1^2 - T_2^2)/(T_1^2 - T_3^2) == \tag{37}$$
$$[(C_{AM} - C_2)/(C_{AM} + C_2)]/[(C_{AM} - C_3)/(C_{AM} + C_3)].$$

Expressions (35), (36) and (37) are measuring measures of angular displacement in the indicated above measurement ranges and explicitly determine angular displacement of movable 1 disc relative to fixed 2 disc. Functional dependency between angular displacement of movable 1 disc relative to fixed 2 disc and expressions (35), (36) and (37) is determined by preliminary calibration.

Computing device of signal conversion unit 6 calculates the following expressions $$(T_2^2 - T_1^2)/(T_2^2 - T_3^2) \tag{38},$$

$$(T_3^2 - T_1^2)/(T_3^2 - T_2^2) \tag{39} \text{ and}$$

$$(T_1^2 - T_2^2)/(T_1^2 - T_3^2) \tag{40}$$

in each 45 degrees of angular displacement of movable 1 disc relative to fixed 2 disc in correspondent measurement range.

Formulas (14), (15) and (16) taking into account equalities (23), (24) and (25) depending on the amount of angular displacement of movable 1 disc relative to fixed 2 disc (see FIG. 8) may be presented in the form of:

In measurement range from 7.5 to 15.5 degrees $$T_4 = 2 \cdot \pi \{ L_B \cdot [C_{0B} + (C_7 \cdot C_{BM})/(C_7 + C_{BM})] \}^{1/2} \tag{41},$$

$$T_5 = 2 \cdot \pi \{ L_B \cdot [C_{0B} + (C_{BM} \cdot C_{BM})/(C_{BM} + C_{BM})] \}^{1/2} \tag{42},$$

$$T_6 = 2 \cdot \pi \{ L_B \cdot [C_{0B} + (C_{BM} \cdot C_{12})/(C_{BM} + C_{12})] \}^{1/2} \tag{43}.$$

In measurement range from 22.5 to 30.5 degrees $$T_4 = 2 \cdot \pi \{ L_B \cdot [C_{0B} + (C_7 \cdot C_{BM})/(C_7 + C_{BM})] \}^{1/2} \tag{44},$$

$$T_5 = 2 \cdot \pi \{ L_B \cdot [C_{0B} + (C_8 \cdot C_{BM})/(C_8 + C_{BM})] \}^{1/2} \tag{45},$$

$$T_6 = 2 \cdot \pi \{ L_B \cdot [C_{0B} + (C_{BM} \cdot C_{BM})/(C_{BM} + C_{BM})] \}^{1/2} \tag{46}.$$

In measurement range from 37.5 to 45.5 degrees $$T_4 = 2 \cdot \pi \{ L_B \cdot [C_{0B} + (C_{BM} \cdot C_{BM})/(C_{BM} + C_{BM})] \}^{1/2} \tag{47},$$

$$T_5 = 2 \cdot \pi \{ L_B \cdot [C_{0B} + (C_8 \cdot C_{BM})/(C_8 + C_{BM})] \}^{1/2} \tag{48},$$

$$T_6 = 2 \cdot \pi \{ L_B \cdot [C_{0B} + (C_9 \cdot C_{BM})/(C_9 + C_{BM})] \}^{1/2} \tag{49}.$$

Computing device of signal conversion unit 6 depending on amount of angular displacement of movable 1 disc relative to fixed 2 disc (see FIG. 8) calculates the following expressions:

In measurement range from 7.5 to 15.5 degrees $$(T_5^2 - T_4^2)/(T_5^2 - T_6^2) = [C_{BM}/2 - (C_7 \cdot C_{BM})/(C_7 + C_{BM})] // \tag{50}$$
$$[C_{BM}/2 - (C_{BM} \cdot C_{12})/(C_{BM} + C_{12})] ==$$
$$[(C_{BM} - C_7)/(C_{BM} + C_7)] / [(C_{BM} - C_{12})/(C_{BM} + C_{12})].$$

In measurement range from 22.5 to 30.5 degrees $$(T_6^2 - T_4^2)/(T_6^2 - T_5^2) == [(C_{BM} - C_7)/ \tag{51}$$
$$(C_{BM} + C_7)] / [(C_{BM} - C_8)/(C_{BM} + C_8)].$$

In measurement range from 37.5 to 45.5 degrees $$(T_4^2 - T_5^2)/(T_4^2 - T_6^2) == \tag{52}$$
$$[(C_{BM} - C_8)/(C_{BM} + C_8)] / [(C_{BM} - C_9)/(C_{BM} + C_9)].$$

Expressions (50), (51) and (52) are measuring measures of angular displacement in the indicated above measurement ranges and explicitly determine angular displacement of movable 1 disc relative to fixed 2 disc. Functional dependency between angular displacement of movable 1 disc relative to fixed 2 disc and expressions (50), (51) and (52) is determined by preliminary calibration.

Computing device of signal conversion unit 6 calculates the following expressions $$(T_5^2 - T_4^2)/(T_5^2 - T_6^2) \tag{53},$$

$$(T_6^2 - T_4^2)/(T_6^2 - T_5^2) \tag{54} \text{ and}$$

$$(T_4^2 - T_5^2)/(T_4^2 - T_6^2) \tag{55}$$

in each 45 degrees of angular displacement of movable 1 disc relative to fixed 2 disc in correspondent measurement range.

For example, when geometric size of conductors of the first 7, the second 8 and the third 9 (or the fourth 10, the fifth 11 and the sixth 12) oscillating circuits changes due to external environment temperature change, change occurs practically proportionate of constant components of capacities and practically proportionate of capacities between electrodes of the indicated oscillating circuits. Due to this, effect to result of measurement of the indicated conductors geometric size change of the first 7, the second 8 and the third 9 (or the fourth 10, the fifth 11 and the sixth 12) oscillating circuits decreases.

Thereby, influence is decreased in the proposed incremental capacitive angular displacement transducer to measuring result of frequency displacement of reference generator (for example, from temperature) of calculating device of signal conversion unit 6, conductors geometric size of the first 7, the second 8 and the third 9 (or the fourth 10, the fifth 11 and the sixth 12) oscillating circuits due to external environment temperature change, dielectric conductivity of external environment and dielectric material, from which movable 1 and fixed 2 discs are produced, distance between movable 1 and fixed 2 discs, and also planes nonparallelism and the indicated discs axis misalignment, which increase measuring accuracy.

Manufacturing error influence decreases of conductors of the first 7, the second 8 and the third 9 (or the fourth 10, the fifth 11 and the sixth 12) oscillating circuits produced by print method in the single manufacturing cycle to percent of suitable units output (movable 1 and fixed 2 discs), which increases manufacturability.

INDUSTRIAL APPLICABILITY

The proposed incremental capacitive angular displacement transducer may be manufactured from available elements and materials in radio production conditions. It will find wide application in the present invention application devices, other special automations of angular displacement measuring and practical forms of its execution will be obvious for specialists from description. The present description and examples are considered as material illustrating the invention, which essence and the extent of patent are determined in the following claims by the aggregate of essential features and their equivalents.

What is claimed is:

1. An incremental capacitive angular displacement transducer comprising:
- a movable dielectric plate;
- a stationary dielectric plate;
- electrode sections jointed by inter-section electrical connections and positioned on a side of the stationary dielectric plate facing the movable dielectric plate;
- sections of two electrodes located on a side of the movable dielectric plate facing the stationary dielectric plate; and
- a signal conversion unit;
- wherein the movable plate is a movable dielectric disc and the stationary dielectric plate is a stationary dielectric disc;
- and further comprising a first group of three oscillating circuits and a second group of three oscillating circuits, each oscillating circuit comprising its respective inductance coil, galvanically isolated from the signal conversion unit;
- wherein the electrode sections forming two electrodes in each of three oscillating circuits of the first group are positioned circumferentially on the side of the stationary dielectric disc facing the movable dielectric disc to form a first circumference;
- wherein the electrode sections forming two electrodes in each of three oscillating circuits of the second group are positioned circumferentially on the side of the stationary dielectric disc facing the movable dielectric disc to form a circumference inside the first circumference;
- wherein the electrode sections of a common electrode of the three oscillating circuits of the first group are positioned circumferentially on the side of the movable dielectric disc facing the stationary dielectric disc to form a second circumference opposite the electrode sections of a first set of six electrodes of the three oscillating circuits of the first group on the stationary dielectric disc;
- wherein the electrode sections of a common electrode of the three oscillating circuits of the second group are positioned circumferentially on the side of the movable dielectric disc facing the stationary dielectric disc to form a circumference inside the second circumference opposite the electrode sections of a second set of six electrodes of the three oscillating circuits of the second group on the stationary dialectic disc; and
- wherein the signal conversion unit comprises:
  - a first set of six inductance coils used to supply energy to a set of six oscillating circuits and
  - a second set of six inductance coils are used to read resonant oscillation frequencies of the set of six oscillating circuits; and
  - wherein the set of six oscillating circuits are formed from the first group of three oscillating circuits and a second group of three oscillating circuits.

2. The incremental capacitive angular displacement transducer according to claim 1, wherein the six inductance coils of the set of six oscillating circuits, the first set of six inductance coils, and the second set of six inductance coils are flat spirals located on an external side of the stationary dielectric disc.

* * * * *